US012034217B2

(12) United States Patent
Xu

(10) Patent No.: US 12,034,217 B2
(45) Date of Patent: Jul. 9, 2024

(54) ANTENNA AND COMMUNICATIONS DEVICE

(71) Applicant: HUAWEI TECHNOLOGIES CO., LTD., Guangdong (CN)

(72) Inventor: Tingwei Xu, Dongguan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 463 days.

(21) Appl. No.: 17/343,469

(22) Filed: Jun. 9, 2021

(65) Prior Publication Data

US 2021/0296786 A1 Sep. 23, 2021

Related U.S. Application Data

(63) Continuation of application No. PCT/CN2019/124171, filed on Dec. 10, 2019.

(30) Foreign Application Priority Data

Dec. 11, 2018 (CN) ......................... 201811511555.7

(51) Int. Cl.
*H01Q 21/06* (2006.01)
*H01Q 9/28* (2006.01)

(52) U.S. Cl.
CPC ........... *H01Q 21/062* (2013.01); *H01Q 9/285* (2013.01)

(58) Field of Classification Search
CPC ...... H01Q 21/062; H01Q 21/26; H01Q 9/285; H01Q 19/10; H01Q 19/108; H01Q 1/521
See application file for complete search history.

(56) References Cited

U.S. PATENT DOCUMENTS

| | | | | |
|---|---|---|---|---|
| 6,266,026 | B1 | 7/2001 | Stengel, Jr. | |
| 10,680,323 | B2 * | 6/2020 | Zhang | H01Q 21/30 |
| 11,018,438 | B2 * | 5/2021 | Waldauer | H01Q 19/108 |
| 11,322,834 | B2 * | 5/2022 | Daojian | H01Q 5/50 |
| 11,329,385 | B2 * | 5/2022 | Harel | H01Q 5/48 |
| 2011/0291905 | A1 * | 12/2011 | Liu | H01Q 9/26 343/797 |
| 2013/0120209 | A1 * | 5/2013 | Mak | H01Q 19/30 343/819 |
| 2013/0187822 | A1 | 7/2013 | Shi et al. | |

(Continued)

FOREIGN PATENT DOCUMENTS

| | | | |
|---|---|---|---|
| CN | 104979635 | A | 10/2015 |
| CN | 105281031 | A | 1/2016 |

(Continued)

OTHER PUBLICATIONS

Extended European Search Report issued in European Application No. 19895868.8 dated Dec. 6, 2021, 13 pages.

(Continued)

*Primary Examiner* — Jason M Crawford
(74) *Attorney, Agent, or Firm* — Fish & Richardson P.C.

(57) ABSTRACT

Embodiments of this application disclose an antenna. The antenna includes a balun structure, a radiation structure disposed on the balun structure, and a coupling structure disposed on the radiation structure. The coupling structure is configured to eliminate or mitigate an interference current, to reduce impact of the interference current on the antenna, thereby reducing radiation of the antenna on the interference current.

18 Claims, 3 Drawing Sheets

(56) References Cited

U.S. PATENT DOCUMENTS

| | | | | |
|---|---|---|---|---|
| 2013/0249771 | A1 | 9/2013 | Kotter et al. | |
| 2014/0374616 | A1 | 12/2014 | Larussi et al. | |
| 2016/0134023 | A1* | 5/2016 | Liu | H01Q 1/246 343/756 |
| 2016/0248170 | A1 | 8/2016 | Bisiules et al. | |
| 2016/0365645 | A1 | 12/2016 | Bisiules | |
| 2017/0054214 | A1 | 2/2017 | Sanders et al. | |
| 2018/0123226 | A1* | 5/2018 | Daojian | H01Q 19/108 |
| 2019/0320450 | A1 | 10/2019 | Li et al. | |
| 2020/0083613 | A1* | 3/2020 | Liu | H01Q 21/24 |
| 2020/0099130 | A1* | 3/2020 | Daojian | H01Q 1/48 |
| 2020/0169002 | A1* | 5/2020 | Waldauer | H01Q 21/062 |
| 2021/0194136 | A1* | 6/2021 | Chen | H01Q 1/38 |
| 2021/0210854 | A1* | 7/2021 | Bai | H01Q 5/307 |
| 2021/0296786 | A1* | 9/2021 | Xu | H01Q 21/062 |
| 2021/0328365 | A1* | 10/2021 | Zhang | H01Q 21/065 |
| 2022/0320739 | A1* | 10/2022 | Narayan | H01Q 1/521 |
| 2022/0328969 | A1* | 10/2022 | Zhang | H01Q 9/045 |
| 2023/0223709 | A1* | 7/2023 | Guntupalli | H01Q 25/001 343/702 |

FOREIGN PATENT DOCUMENTS

| | | | |
|---|---|---|---|
| CN | 105337021 | A | 2/2016 |
| CN | 105655702 | A | 6/2016 |
| CN | 107295674 | A | 10/2017 |
| CN | 206628592 | U | 11/2017 |
| CN | 107834177 | A | 3/2018 |
| CN | 108539396 | A | 9/2018 |
| EP | 3389138 | A1 | 10/2018 |
| WO | 2018072827 | A1 | 4/2018 |

OTHER PUBLICATIONS

Office Action issued in Chinese Application No. 201811511555.7 dated Jun. 9, 2021, 23 pages (with English translation).

PCT International Search Report and Written Opinion issued in International Application No. PCT/CN2019/124171 dated Mar. 9, 2020, 15 pages (with English translation).

Office Action in Indian Appln. No. 202147027784, mailed on Mar. 4, 2024, 2 pages (with English translation).

* cited by examiner

ANTENNA AND COMMUNICATIONS DEVICE

CROSS-REFERENCE TO RELATED APPLICATIONS

This application is a continuation of International Application No. PCT/CN2019/124171, filed on Dec. 10, 2019, which claims priority to Chinese Patent Application No. 201811511555.7, filed on Dec. 11, 2018. The disclosures of the aforementioned applications are hereby incorporated by reference in their entireties.

TECHNICAL FIELD

This application relates to the field of mobile communications technologies, and in particular, to an antenna and a communications device.

BACKGROUND

An antenna is easily interfered by an external current in a working process, resulting in impact on a radiation characteristic of the antenna. For example, some antenna apparatuses each include at least one high-frequency antenna and one low-frequency antenna. When the antenna apparatus operates, a radiation current of the high-frequency antenna is an interference current for the low-frequency antenna, and a radiation current of the low-frequency antenna is also an interference current for the high-frequency antenna. Consequently, radiation characteristics of both the high-frequency antenna and the low-frequency antenna are affected. Particularly, after radiant energy of the high-frequency antenna is induced in the low-frequency antenna, re-radiation and superimposition is formed. Consequently, high frequency radiation performance is affected. Therefore, it is especially necessary to eliminate the high-frequency radiation current induced in the low-frequency antenna, to reduce re-radiation of the low-frequency antenna.

SUMMARY

Embodiments of this application provide an antenna, to reduce impact of an interference current on a radiation characteristic of the antenna, thereby reducing radiation of the antenna on an interference current.

According to a first aspect, an antenna is provided. The antenna includes a balun structure, a radiation structure disposed on the balun structure, and a coupling structure disposed on the radiation structure. The coupling structure is configured to eliminate or mitigate an interference current, to reduce radiation of the antenna on the interference current.

The interference current described in this application is a current that affects antenna radiation, and may be a current that causes interference to the antenna radiation and that is directly conducted to the antenna, coupled to the antenna, or induced in the antenna. In addition, it is well known to a person skilled in the art that an electric field and a magnetic field can be converted to each other. Therefore, the interference current described in this application may alternatively be an interference electromagnetic wave. For example, the interference current may be a radiation current of another antenna, an induced current generated when radiant energy of the another antenna is induced in the antenna, or an electromagnetic wave radiated by the another antenna. In a possible implementation, the antenna is used as a first antenna, and the interference current includes a radiation current of a second antenna, or the interference current includes a current generated when radiant energy of the second antenna is induced in the first antenna. Optionally, an operating frequency of the second antenna is different from that of the first antenna.

In a possible implementation, the coupling structure is in direct electrical connection to the radiation structure, or the coupling structure is in coupled electrical connection to the radiation structure.

In a possible implementation, the coupling structure and the radiation structure are on a same plane, or the coupling structure and the radiation structure are on different planes.

In a possible implementation, the coupling structure is an L-shaped stub.

The L-shaped stub includes a first stub and a second stub, one end of the first stub and one end of the second stub are connected to form an L shape, the end of the first stub is electrically connected to the end of the second stub, the L-shaped stub is electrically connected to the radiation structure through the other end of the first stub, and the other end of the second stub is not connected.

In a possible implementation, an included angle between the second stub and the radiation structure is greater than or equal to 0° and less than or equal to 180°.

In a possible implementation, the antenna includes a plurality of L-shaped stubs, the plurality of L-shaped stubs are separately disposed on the radiation structure, directions of the L-shaped stubs are the same or different, and a direction of the L-shaped stub is an extension direction of the other end of the second stub of the L-shaped stub.

In a possible implementation, the plurality of L-shaped stubs are disposed on the radiation structure at regular intervals.

In a possible implementation, lengths of the plurality of L-shaped stubs are the same or different, and a length of the L-shaped stub is a sum of lengths of the first stub and the second stub.

In a possible implementation, two adjacent L-shaped stubs with opposite directions may be combined into one T-shaped stub.

In a possible implementation, the first stub and/or the second stub are/is in a curved shape. For example, the first stub and/or the second stub are/is in a wavy shape.

In a possible implementation, the first stub and/or the second stub are/is in a curved shape. For example, the first stub and/or the second stub are/is in a sawtooth shape.

In a possible implementation, the coupling structure is an arc-shaped stub, one end of the arc-shaped stub is electrically connected to the radiation structure, and the other end of the arc-shaped stub is not connected.

In a possible implementation, the coupling structure is a plane-shaped structure or a plate-shaped structure. For example, the coupling structure is a racket-like structure.

In a possible implementation, that the coupling structure is a conductive structure includes that the coupling structure is a metal structure, or that the coupling structure is a printed circuit board PCB structure.

In a possible implementation, the radiation structure is a radiation arm. Optionally, the radiation structure may alternatively be a radiation patch structure.

According to a second aspect, an antenna apparatus is provided. The antenna apparatus includes a first antenna, a second antenna, and a reflection panel. The first antenna and the second antenna are mounted on the reflection panel. The first antenna is the antenna according to any one of the first aspect or the possible implementations of the first aspect. An interference current includes a radiation current of the second antenna. In other words, the interference current includes a current generated when radiant energy of the second antenna is induced in the first antenna.

According to a third aspect, an antenna array is provided. The antenna array includes the antenna according to any one of the first aspect or the possible implementations of the first aspect, and/or the antenna apparatus according to the second aspect.

According to a fourth aspect, a communications device is provided. The communications device includes the antenna according to any one of the first aspect or the possible implementations of the first aspect, and/or the antenna apparatus according to the second aspect, and/or the antenna array according to the third aspect.

Beneficial effects brought by technical solutions provided in the embodiments of this application are as follows: The coupling structure is disposed on the radiation structure. An interference current coupled to the coupling structure and an interference current coupled to the radiation structure can be mutually eliminated or mitigated, to achieve a purpose of mitigation. In this way, impact of external interference on a radiation characteristic of the antenna is reduced, thereby reducing radiation of the antenna on an interference current. For example, the antenna provided in the embodiments of this application may be used between antenna apparatuses or between antenna arrays, to reduce interference between antennas and correspondingly improve performance of the communications device provided in this application.

DESCRIPTION OF EMBODIMENTS

As one of key devices in a communications system, an antenna especially has an increasingly high requirement on an anti-interference capability of the antenna. Therefore, this application provides an antenna, to reduce impact of external interference.

Figure 1:
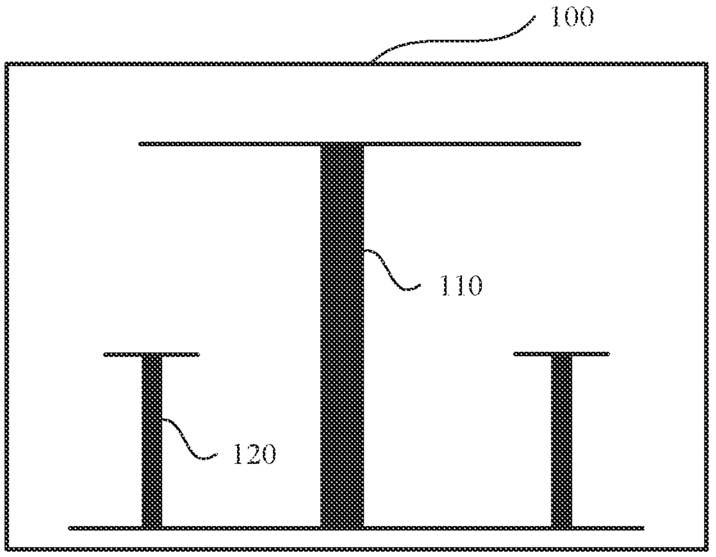
FIG. 1 is a schematic diagram of a scenario according to an embodiment of this application.

As there are more demands for communications resources, the communications system has an increasingly high requirement on an operating frequency band of the antenna. For example, the antenna needs to be compatible with a plurality of operating frequency bands to be applicable to a plurality of operating environments. FIG. 1 is a schematic diagram of an antenna apparatus 100. The antenna apparatus 100 includes an antenna 110 and an antenna 120. The antenna 110 and the antenna 120 work in different frequency bands. For ease of description, the antenna apparatus 100 is described by using dual-band as an example. Specifically, an operating frequency of the antenna 110 is f1, and an operating frequency of the antenna 120 is f2, where f2 is greater than f1, and both f1 and f2 are positive numbers. Therefore, the antenna 110 may also be referred to as a low-frequency antenna, and the antenna 120 may also be referred to as a high-frequency antenna. In this case, an operating wavelength of the antenna 110 is larger than an operating wavelength of the antenna 120. Therefore, a size of the antenna 110 is larger than a size of the antenna 120. In addition, the antenna 110 is relatively close to the antenna 120. Consequently, the antenna 110 interferes with radiation performance of the antenna 120. In addition, if a value of f2 is about twice a value of f1, interference of the antenna 110 to the radiation performance of the antenna 120 is greater. It should be noted that the antenna apparatus 100 provided in this embodiment of this application is merely an example. The antenna 110 and the antenna 120 may have a same structure or different structures. For example, the antenna 110 and the antenna 120 may both be die casting antennas; the antenna 110 is a die casting antenna, and the antenna 120 is a dielectric antenna; or the antenna 110 is a dual-band antenna, and the antenna 120 is a single-band antenna. This is not limited in this embodiment of this application.

An embodiment of this application provides an antenna. A coupling structure is disposed on a radiation structure of the antenna. An interference current is eliminated or mitigated by using the coupling structure. To be specific, the coupling structure is cleverly designed on the radiation structure, so that an interference current coupled to the coupling structure and an interference current coupled to the radiation structure can be mutually eliminated or mitigated, to achieve a purpose of decoupling, thereby reducing impact of the interference current on antenna radiation, and reducing radiation of the antenna on the interference current. The interference current, namely, a current affecting the antenna radiation (or an electromagnetic wave affecting the antenna radiation), is well known to a person skilled in the art.

The interference current described in this application is a current that affects the antenna radiation, and may be a current that causes interference to the antenna radiation and that is directly conducted to the antenna, coupled to the antenna, or induced in the antenna. In addition, it is well known to a person skilled in the art that an electric field and a magnetic field can be converted to each other. Therefore, the interference current described in this application may alternatively be an interference electromagnetic wave. For example, the interference current may be a radiation current of another antenna, an induced current generated when radiant energy of the another antenna is induced in the antenna, or an electromagnetic wave radiated by the another antenna.

Figure 2A:
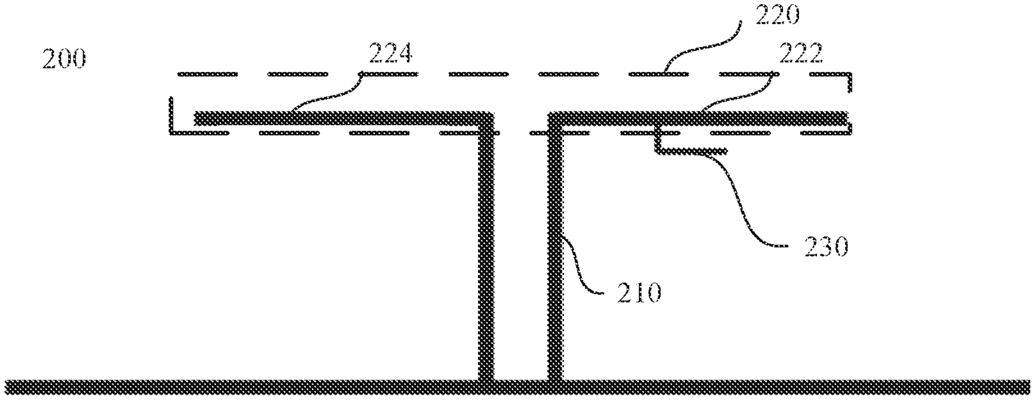
FIG. 2A is a schematic structural diagram of an antenna according to an embodiment of this application.
Figure 2B:
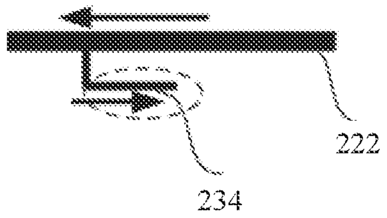
FIG. 2B is a partial enlarged diagram of FIG. 2A.

FIG. 2A is a schematic structural diagram of an antenna 200 according to an embodiment of this application. The antenna is a dipole antenna, and includes a balun structure 210, a radiation structure 220, and a coupling structure 230. The radiation structure 220 includes a radiation arm 222 and a radiation arm 224, the radiation structure 220 is disposed on the balun structure 210, and the coupling structure 230 is disposed on the radiation structure 220, and is specifically disposed on the radiation arm 222 of the radiation structure 220. FIG. 2B is a partial enlarged diagram of FIG. 2A, and is a schematic diagram of mitigating an interference current by the coupling structure 230. It can be learned that, a direction of an interference current coupled to a partial coupling structure 234 of the coupling structure 230 shown in this embodiment of this application is opposite to a direction of an interference current coupled to the radiation arm 222. When the interference current coupled to the partial coupling structure 234 and the interference current coupled to the radiation arm 222 have exactly opposite directions and equal amplitudes, impact of the interference current on a radiation characteristic of the antenna 200 can be eliminated. A mitigation effect of the coupling structure 230 shown in FIG. 2B is merely an example. Optionally, the impact of the interference currents on the radiation characteristic of the antenna 200 can be reduced provided that a component opposite to the direction of the interference current coupled to the radiation arm 222 can be split in the direction of the interference current coupled to the coupling structure 230. This also falls within the protection scope of this application. Therefore, disposing a coupling structure on a radiation structure for mitigation to reduce impact of external interference on a radiation characteristic of an antenna falls within the protection scope of this application. The directions of the interference currents shown in FIG. 2B are merely examples. This is not limited in this embodiment of this application.

Figure 3:
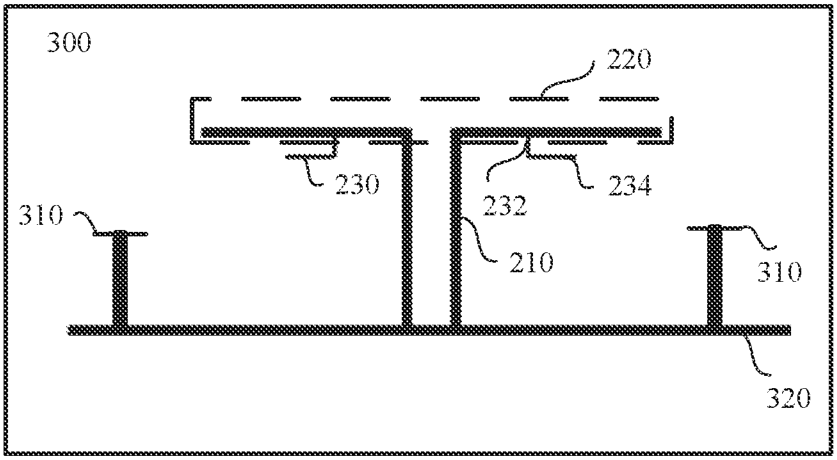
FIG. 3 is a schematic structural diagram of an antenna apparatus according to an embodiment of this application.

FIG. 3 is a schematic structural diagram of an antenna apparatus 300 according to an embodiment of this application. Refer to FIG. 2A. In addition to the antenna 200 shown in FIG. 2A, the antenna apparatus further includes an antenna 310 and a reflection panel 320. Both the antenna 200 and the antenna 310 are disposed on the reflection panel 320. For the antenna 200, the interference current includes a radiation current of the antenna 310. In other words, the interference current includes a current generated when radiant energy of the antenna 310 is induced in the antenna 200. The coupling structure 230 is disposed on the radiation structure of the antenna 200, so that the interference current coupled to the coupling structure 230 and the interference current coupled to the radiation structure can be mutually eliminated or mitigated, to achieve a purpose of mitigation. Because a radiation current that is of the antenna 200 and that is coupled to the antenna 310 becomes smaller, that is, there is less impact of interference of the antenna 200 on a radiation characteristic of the antenna 310, and because the radiation current that is of the antenna 310 and that is induced in the antenna 200 is reduced, re-radiation generated by the antenna 200 is reduced, that is, radiation of the radiation current that is of the antenna 310 and that is coupled to (or induced in) the antenna 200 is reduced, thereby reducing the impact of the antenna 200 on the radiation characteristic of the antenna 310. It can be learned that impact between the antenna 200 and the antenna 310 can be reduced by using the antenna 200 provided in this application, and in particular, by using the coupling structure 230 disposed on the antenna 200.

For example, the radiation structure 220 shown in FIG. 2A or FIG. 3 may be a radiation arm structure, or the radiation structure 220 may be a radiation patch structure. A structural form of the radiation structure 220 is not limited in this application.

It can be learned that, by using the antenna provided in this embodiment of this application, the coupling structure 230 disposed on the antenna 200, for example, the coupling structure shown in FIG. 2A or FIG. 3, is connected to the radiation arm of the antenna, so that the interference current coupled to the coupling structure 230 and the interference current coupled to the radiation structure can be mutually eliminated or mitigated, to achieve a purpose of decoupling, and the radiation current that is of the antenna 310 and that is coupled to (or induced in) the antenna 200 is reduced, thereby reducing re-radiation, and reducing the impact of the antenna 200 on the radiation characteristic of the antenna 310. In addition, impact of the antenna 310 on the radiation characteristic of the antenna 200 is also reduced, that is, interference between the antenna 200 and the antenna 310 is reduced.

The coupling structure provided in this embodiment of this application is a conductive structure. For example, the coupling structure is a metal structure, or the coupling structure is a printed circuit board (Printed Circuit Board, PCB) structure.

The coupling structure and the radiation structure provided in this embodiment of this application are electrically connected in the following manner.

Figure 4:
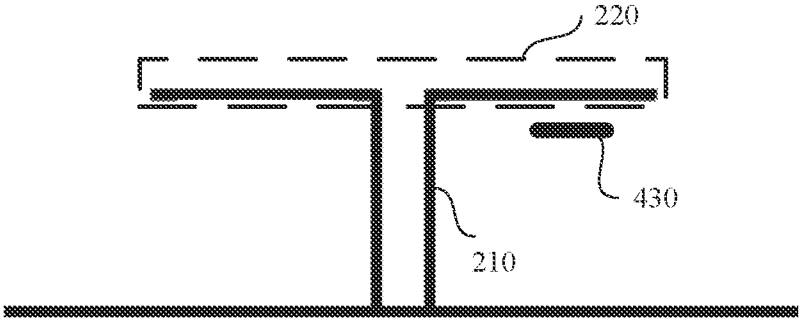
FIG. 4 is a schematic structural diagram of an antenna according to an embodiment of this application.

Manner 1: Still refer to FIG. 2A or FIG. 3. The coupling structure is in direct electrical connection to the radiation structure; or Manner 2: FIG. 4 is a schematic diagram of coupled connection between a coupling structure and a radiation structure. A coupling structure 430 is not in direct contact with but in coupled electrical connection to the radiation structure 220. For example, the coupling structure 430 can be disposed on the radiation structure 220 by using a medium between the coupling structure 430 and the radiation structure 220.

Still refer to FIG. 2A to FIG. 4. The coupling structure 230 and the radiation structure 220 are not on a same plane. Optionally, the coupling structure and the radiation structure may be on a same plane.

Still refer to FIG. 3. The coupling structure 230 shown in FIG. 3 is an L-shaped stub. The L-shaped stub specifically includes a first stub 232 and a second stub 234. One end of the first stub 232 and one end of the second stub 234 are connected to form an L shape, the end of the first stub 232 is electrically connected to the end of the second stub 234, the coupling structure is electrically connected to the radiation structure 220 through the other end of the first stub 232, and the other end of the second stub 234 is not connected.

It can be learned that a structure of the L-shaped stub is relatively simple. In addition, by using the coupling structure that is the L-shaped stub, a fabrication process is simple, and the impact of the antenna 200 on the radiation characteristic of the antenna 310 is reduced at low costs. In addition, the impact of the antenna 310 on the antenna 200 is also reduced, that is, the interference between the antenna 200 and the antenna 310 is reduced.

In addition, the second stub 234 of the L-shaped stub is parallel to the radiation structure, so that the impact of the antenna 200 on the radiation characteristic of the antenna 310 is reduced more greatly by using the L-shaped stub. Certainly, an included angle between the second stub 234 and the radiation structure may further be designed as required. The included angle between the second stub 234 and the radiation structure may be arbitrary, and may be greater than or equal to 0° and less than or equal to 180°.

A length of the L-shaped stub shown in FIG. 3 may be approximately ⅛ of an operating center wavelength of the antenna 310.

A maximum distance between the second stub of the L-shaped stub and the radiation structure described in FIG. 3 is less than or equal to ⅛ of the operating center wavelength of the antenna 310.

Optionally, the antenna may include a plurality of L-shaped stubs. The plurality of L-shaped stubs are separately disposed on the radiation structure, directions of the L-shaped stubs are the same or different, and a direction of the L-shaped stub is an extension direction of the other end of the second stub of the L-shaped stub. Still refer to FIG. 3. The antenna shown in FIG. 3 includes two L-shaped stubs, and directions of the two L-shaped stubs are different.

In a possible implementation, the plurality of L-shaped stubs are connected to the radiation structure at regular intervals. Optionally, the plurality of L-shaped stubs are electrically connected to the radiation structure at irregular intervals.

Figure 5:
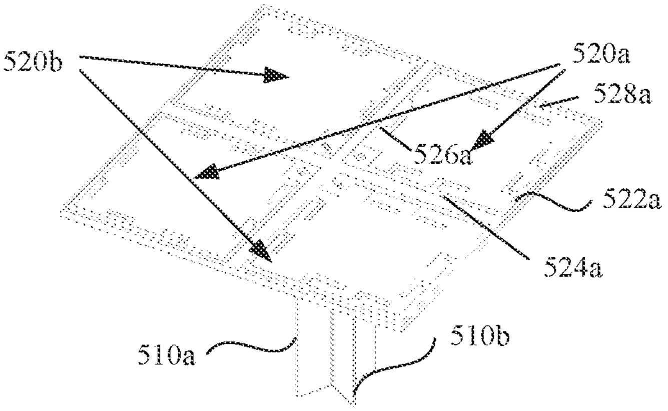
FIG. 5 is a schematic structural diagram of an antenna according to an embodiment of this application.

FIG. 5 is a schematic structural diagram of an antenna according to an embodiment of this application. The antenna 500 shown in FIG. 5 is a dipole antenna in a PCB structure. A coupling structure 530 shown in FIG. 5 is an L-shaped stub. The antenna 500 is a dual-polarized antenna, including two radiation structures (both are dipoles): a radiation structure 520*a* and a radiation structure 520*b*. Each radiation structure (the radiation structure 520*a* or the radiation structure 520*b*) includes two radiation arms, and each radiation arm includes four radiation sub-arms. A radiation arm 521*a* is used as an example for description. The radiation arm 521*a* includes a radiation sub-arm 522*a*, a radiation sub-arm 524*a*, a radiation sub-arm 526*a*, and a radiation sub-arm 528*a*. The radiation structure 520*a* is connected to a balun structure 510*a*, and the radiation structure 520*b* is connected to a balun structure 510*b*. In addition, the radiation structure 520*a* and the radiation structure 520*b* shown in FIG. 5 each are disposed with a plurality of L-shaped stubs, that is, the radiation structure 520*a* and the radiation structure 520*b* each are electrically connected to the plurality of L-shaped stubs. As shown in FIG. 5, directions of L-shaped stubs of a same radiation sub-arm of the radiation structure (520*a* or 520*b*) are the same. For example, directions of two L-shaped stubs on the radiation sub-arm 522*a* are the same. Directions of L-shaped stubs on different radiation sub-arms are different. For example, the directions of the L-shaped stubs on the radiation sub-arm 522*a* and directions of L-shaped stubs of on the radiation sub-arm 524*a* are different. Optionally, directions of L-shaped stubs of a same radiation sub-arm of a radiation structure may be the same or may be different (not shown). When two L-shaped stubs with opposite directions are adjacent, the two L-shaped stubs may be combined into one T-shaped stub (not shown). When an interference current coupled to a radiation sub-arm and an interference current coupled to a coupling structure on the radiation sub-arm have opposite directions and equal amplitudes, the antenna has a strongest anti-interference capability.

Figure 6:
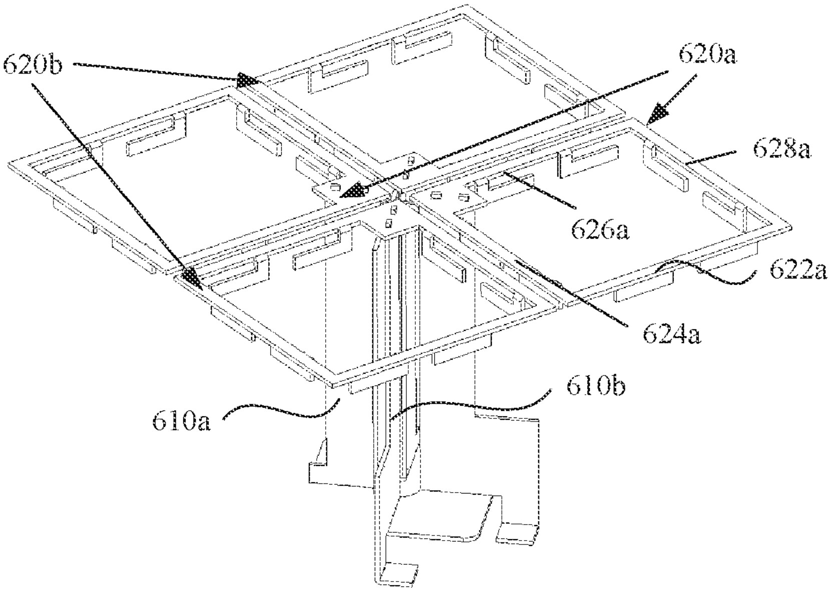
FIG. 6 is a schematic structural diagram of an antenna according to an embodiment of this application.

The coupling structure and the radiation structure that are shown in FIG. 5 are on a same plane. Optionally, the coupling structure and the radiation structure may alternatively be on different planes. FIG. 6 is a schematic structural diagram of an antenna according to an embodiment of this application. A coupling structure 630 shown in FIG. 6 is also an L-shaped stub, the coupling structure 630 and a radiation structure 620 are not on a same plane, and the antenna 600 is a dipole antenna in a die casting form. A structure of the antenna shown in FIG. 6 is similar to the structure shown in FIG. 5. Details are not described herein again.

It should be noted that a structural form of the antenna shown in FIG. 5 or FIG. 6 is merely an example. Optionally, the antenna may alternatively be a single-polarized antenna, a horn antenna, or the like. The structure of the antenna is not limited in this application.

A plurality of L-shaped stubs shown in FIG. 5 and FIG. 6 are disposed on the radiation structure (the radiation structure 520*a* or the radiation structure 520*b*) at regular intervals, that is, the plurality of L-shaped stubs are electrically connected to the radiation structure at regular intervals.

The antennas shown in FIG. 5 and FIG. 6 each include a plurality of L-shaped stubs, and different L-shaped stubs have a same length. Optionally, the different L-shaped stubs have different lengths (not shown), and a length of an L-shaped stub is a sum of lengths of a first stub and a second stub. For example, first stubs of different L-shaped stubs have a same length, but second stubs of the L-shaped stubs have different lengths; second stubs of different L-shaped stubs have a same length, but first stubs of the L-shaped stubs have different lengths: first stubs of different L-shaped stubs have different lengths, and second stubs of the L-shaped stubs have different lengths; or first stubs of different L-shaped stubs have a same length, and second stubs of the L-shaped stubs have a same length.

Both the first stub and the second stub of the L-shaped stub described above are straight-line stub structures. Optionally, the first stub and/or the second stub may alternatively be in a curved shape. For example, the first stub and/or the second stub may be in a wavy shape. Alternatively, the first stub and/or the second stub may be in a polygonal-line shape. For example, the first stub and/or the second stub are/is in a sawtooth shape. Alternatively, the first stub and/or the second stub may be in another curved shape. This is not limited in this application.

Optionally, the coupling structure may alternatively be another structure, for example, an arc-shaped stub. One end of the arc-shaped stub is electrically connected to the radiation structure, and the other end of the arc-shaped stub is not connected.

Alternatively, the coupling structure provided in this embodiment of this application may be a plane-shaped structure or a plate-shaped structure, for example, a racket-like coupling structure. The racket-like structure includes a handle structure and a paddle structure. One end of the handle structure is electrically connected to the paddle structure, and the other end of the handle structure is electrically connected to a radiation arm structure. The coupling structure herein is merely an example, and may alternatively be another plane-shaped structure or plate-shaped structure. This is not limited in this application.

An embodiment of this application further provides an antenna apparatus, including any one of the foregoing antennas on which a coupling structure is disposed, and further including a second antenna. An antenna 200 is used as a first antenna, both the antenna 200 and the second antenna are disposed on a reflection panel, and an interference current includes a radiation current of the second antenna. In other words, the interference current includes a current generated when radiant energy of the second antenna is induced in the first antenna. Optionally, the second antenna may be an antenna on which a coupling structure is disposed according to this application, or may be an antenna on which the coupling structure is not disposed.

An embodiment of this application further provides an antenna array, including any foregoing antenna and/or the foregoing antenna apparatus.

An embodiment of this application provides a communications device, including any one of the foregoing antennas, and/or the foregoing antenna apparatus, and/or any one of the foregoing antenna arrays.

It can be learned that, the coupling structure is disposed on a radiation structure, and an interference current coupled to the coupling structure and an interference current coupled to the radiation structure can be mutually eliminated or mitigated, to achieve a purpose of decoupling. In this way, impact of external interference on a radiation characteristic of the antenna is reduced, thereby reducing radiation of the antenna on an interference current. For example, the antenna provided in the embodiments of this application may be used between antenna apparatuses or between antenna arrays, to reduce interference between antennas and correspondingly improve performance of the communications device provided in this application.

The foregoing descriptions are merely the embodiments of this application, but are not intended to limit this application. Any modification, equivalent replacement, or improvement made without departing from the spirit and principle of this application should fall within the protection scope of this application.

What is claimed is:

1. An antenna, wherein the antenna comprises:
a balun structure;
a radiation structure, disposed on the balun structure; and
a coupling structure, disposed on the radiation structure, wherein the coupling structure is configured to eliminate or mitigate an interference current, to reduce radiation of the antenna on the interference current.

2. The antenna according to claim 1, wherein the antenna is a first antenna, and the interference current comprises a radiation current generated by the first antenna as induced from a second antenna.

3. The antenna according to claim 1, wherein the coupling structure is in direct electrical connection to the radiation structure, or the coupling structure is in coupled electrical connection to the radiation structure.

4. The antenna according to claim 1, wherein the coupling structure and the radiation structure are on a same plane, or the coupling structure and the radiation structure are on different planes.

5. The antenna according to claim 1, wherein the coupling structure is an L-shaped stub, the L-shaped stub comprises a first stub and a second stub, one end of the first stub and one end of the second stub are connected to form an L shape, the end of the first stub is electrically connected to the end of the second stub, the L-shaped stub is electrically connected to the radiation structure through the other end of the first stub, and the other end of the second stub is not connected.

6. The antenna according to claim 5, wherein an included angle between the second stub and the radiation structure is greater than or equal to 0° and less than or equal to 180°.

7. The antenna according to claim 5, wherein the antenna comprises a plurality of L-shaped stubs, the plurality of L-shaped stubs are separately disposed on the radiation structure, directions of the L-shaped stubs are different, and a direction of the L-shaped stub is an extension direction of the other end of the second stub of the L-shaped stub.

8. The antenna according to claim 7, wherein the plurality of L-shaped stubs are disposed on the radiation structure at regular intervals.

9. The antenna according to claim 8, wherein lengths of the plurality of L-shaped stubs are the same, and a length of the L-shaped stub is a sum of lengths of the first stub and the second stub.

10. The antenna according to claim 5, wherein two adjacent L-shaped stubs with opposite directions are combined into one T-shaped stub.

11. The antenna according to claim 5, wherein at least one of the first stub or the second stub is in a curved shape.

12. The antenna according to claim 1, wherein the coupling structure is an arc-shaped stub, one end of the arc-shaped stub is electrically connected to the radiation structure, and the other end of the arc-shaped stub is not connected.

13. The antenna according to claim 1, wherein the coupling structure is a plane-shaped structure or a plate-shaped structure.

14. The antenna according to claim 1, wherein the coupling structure is a conductive structure, and the conductive structure comprises a metal structure; or the coupling structure is a printed circuit board (PCB) structure.

15. The antenna according to claim 1, wherein the radiation structure is a radiation arm.

16. An antenna apparatus, comprising a first antenna, a second antenna, and a reflection panel, wherein the first antenna and the second antenna are mounted on the reflection panel, and an interference current comprises a radiation current generated by the first antenna as induced from a second antenna, and wherein the first antenna comprises:
a balun structure;
a radiation structure, disposed on the balun structure; and
a coupling structure, disposed on the radiation structure, wherein the coupling structure is configured to eliminate or mitigate an interference current, to reduce radiation of the first antenna on the interference current.

17. An antenna array, wherein the antenna array comprises an antenna, and wherein the antenna comprises:
a balun structure;
a radiation structure, disposed on the balun structure; and
a coupling structure, disposed on the radiation structure, wherein the coupling structure is configured to eliminate or mitigate an interference current, to reduce radiation of the antenna on the interference current.

18. A communications device, wherein the communications device comprises an antenna, and wherein the antenna comprises:
a balun structure;
a radiation structure, disposed on the balun structure; and
a coupling structure, disposed on the radiation structure, wherein the coupling structure is configured to eliminate or mitigate an interference current, to reduce radiation of the antenna on the interference current.

* * * * *